United States Patent
Konno et al.

(10) Patent No.: US 10,647,818 B2
(45) Date of Patent: May 12, 2020

(54) POLYARYLENE SULFIDE PRODUCTION METHOD AND POLYARYLENE SULFIDE

(71) Applicant: Kureha Corporation, Tokyo (JP)

(72) Inventors: Akihiro Konno, Tokyo (JP); Ken-Ichi Takaki, Tokyo (JP); Yui Yoshida, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 160 days.

(21) Appl. No.: 15/529,354

(22) PCT Filed: Dec. 18, 2015

(86) PCT No.: PCT/JP2015/085564
§ 371 (c)(1),
(2) Date: May 24, 2017

(87) PCT Pub. No.: WO2016/111146
PCT Pub. Date: Jul. 14, 2016

(65) Prior Publication Data
US 2018/0340043 A1    Nov. 29, 2018

(30) Foreign Application Priority Data
Jan. 9, 2015  (JP) ................................ 2015-003164

(51) Int. Cl.
*C08G 75/0263*   (2016.01)
*C08G 75/02*    (2016.01)

(52) U.S. Cl.
CPC ......... *C08G 75/0263* (2013.01); *C08G 75/02* (2013.01)

(58) Field of Classification Search
CPC ................ C08G 75/14; C08G 75/0263; C08G 75/0268; C08G 75/0259; C08G 75/025; B30B 9/28
See application file for complete search history.

(56) References Cited

U.S. PATENT DOCUMENTS

| | | |
|---|---|---|
| 8,138,302 B2 | 3/2012 | Sato et al. |
| 8,609,790 B2 | 12/2013 | Suzuki et al. |
| 9,255,350 B2 | 2/2016 | Taniguchi et al. |
| 2006/0084785 A1 | 4/2006 | Sato et al. |
| 2007/0265425 A1 | 11/2007 | Suzuki et al. |
| 2011/0178268 A1 | 7/2011 | Suzuki et al. |
| 2013/0022808 A1* | 1/2013 | Taniguchi .......... C08G 75/0231 428/221 |

FOREIGN PATENT DOCUMENTS

| | | |
|---|---|---|
| CN | 102105513 A | 6/2011 |
| CN | 102822239 A | 12/2012 |
| JP | 2000191785 A | 7/2000 |
| TW | 200951181 A | 12/2009 |
| WO | WO2004060972 A1 | 7/2004 |
| WO | WO2006046748 A1 | 5/2006 |
| WO | WO2009125556 A1 | 10/2009 |
| WO | WO2010013545 A1 | 2/2010 |
| WO | WO2011125480 A1 | 10/2011 |

OTHER PUBLICATIONS

First Office Action from State Intellectual Property Office for PCT/JP2015/085564/CN201580060684.7 dated Jan. 2, 2018.
Search Report from State Intellectual Property Office for PCT/JP2015/085564/CN201580060684.7 dated Dec. 4, 2017.
First Office Action from Korean Intellectual Property Office for PCT/JP2015/085564/KR10-2017-7011843 dated Jul. 31, 2017.
International Search Report for PCT/JP2015/085564 dated Feb. 2, 2016.
Second Office Action from State Intellectual Property Office for CN201580060684.7/PCT/JP2015/085564 dated Mar. 30, 2018.
Translation of the Second Office Action from State Intellectual Property Office for CN201580060684.7/PCT/JP2015/085564 dated Mar. 30, 2018.
Notification of Reasons for Refusal issued by the Japanese Patent Office for JP2015-003164 dated Jul. 24, 2018.
Translation of Notification of Reasons for Refusal issued by the Japanese Patent Office for JP2015-003164 dated Jul. 24, 2018.

* cited by examiner

*Primary Examiner* — Shane Fang
(74) *Attorney, Agent, or Firm* — Abel Schillinger, LLP

(57) ABSTRACT

A method of producing a polyarylene sulfide (PAS) includes a preparation step of preparing a charged mixture containing an organic amide solvent, a sulfur source, water, and a dihalo aromatic compound; a first-stage polymerization step of performing a polymerization reaction on the charged mixture at a temperature of from 170 to 280° C. to produce a prepolymer having a conversion ratio of the dihalo aromatic compound of 50% or greater; and a second-stage polymerization step of continuing the polymerization reaction in a phase-separated state at a temperature of from 245 to 290° C. in a reaction system containing the prepolymer, and includes adding a polyfunctional compound to the reaction system in the phase-separated state. A PAS having a melt viscosity (310° C., shear rate: 1216 $sec^{-1}$) of from 0.1 to 8000 Pa·s is produced by the method.

12 Claims, No Drawings

POLYARYLENE SULFIDE PRODUCTION METHOD AND POLYARYLENE SULFIDE

TECHNICAL FIELD

The present invention relates to a method of producing a polyarylene sulfide in which a sulfur source and a dihalo aromatic compound are subjected to a polymerization reaction in an organic amide solvent. In particular, the present invention relates to a method of producing a polyarylene sulfide in which a sulfur source and a dihalo aromatic compound are polymerized in an organic amide solvent by a polymerization process including a phase-separated polymerization step, and a polyarylene sulfide.

BACKGROUND ART

A polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. The PAS has been widely used in a wide variety of fields of electric/electronic devices, devices for automobiles, and the like, since the PAS can be formed into various molded products, films, sheets, fibers, and the like by ordinary melt processing methods such as extrusion molding, injection molding, and compression molding.

As a representative method of producing a PAS, a method in which a sulfur source and a dihalo aromatic compound such as p-dichlorobenzene (hereinafter, also referred to as "pDCB") are subjected to a polymerization reaction in an organic amide solvent such as N-methyl-2-pyrrolidone (hereinafter, also referred to as "NMP") has been known.

With expanded application of a PAS, particularly with spread application of a molded product by melt processing, for example, a PAS having a high degree of polymerization, specifically a PAS having a high melt viscosity has been required as a PAS having excellent product characteristics, formability, and the like. A PAS composition that contains a PAS obtained by a polymerization reaction in the presence of a polyhaloaromatic compound having three or more halogen substituents in each molecule and has excellent organic solvent resistance (Patent Document 1) and a branched PAS which is obtained by a polymerization reaction in the presence of the polyhaloaromatic compound and has excellent spinning and stretching characteristics, and the like (Patent Document 2) have been known. In Patent Documents 1 and 2, the polyhaloaromatic compound is contained in an initial stage or a former polymerization step of the polymerization reaction.

With increased demand for a PAS, increase in yield during production of the PAS has been also required. Patent Document 3 discloses a production process of a PAS including a step of adding an aromatic compound such as a dihalo aromatic compound and a trihalo aromatic compound to a liquid phase in a polymerization reaction system after a phase-separated polymerization step, and a step of cooling the liquid phase, by which a granular PAS can be obtained at a high yield while retaining a melt viscosity at a high level. Specifically, Patent Document 3 describes a method in which pDCB which is a dihalo aromatic compound is added in an amount of 1.3 mol relative to 100 mol of NMP after completion of a second-stage polymerization (after a phase-separation step), and the liquid phase is slowly cooled by controlling a cooling rate to 0.8° C./min at a temperature of from 260° C. to 220° C., and then cooled to around room temperature without temperature control.

Patent Document 3 also discloses that the amount of waste such as oligomers and a finely particulate PAS can be reduced with increase in yield. As concern about environmental problems has grown, a method capable of further effectively reducing the generation of byproducts such as oligomers and a finely particulate PAS, which need to spend high cost and many processes for a detoxification treatment of industrial waste, has been required as the production method of a PAS, in addition to further increase in yield of a PAS having a high degree of polymerization.

Therefore, provision of a method of producing a PAS by a polymerization reaction of a sulfur source and a dihalo aromatic compound in an organic amide solvent, in which a PAS having a high degree of polymerization can be obtained at a high yield and the generation of a byproduct that imposes a large burden of a waste treatment and the like can be effectively reduced, has been required.

CITATION LIST

Patent Literature

Patent Document 1: WO 2009/125556
Patent Document 2: WO 2011/125480
Patent Document 3: WO 2010/013545

SUMMARY OF INVENTION

Technical Problem

An object of the present invention is to provide a method of producing a PAS by a polymerization reaction of a sulfur source and a dihalo aromatic compound in an organic amide solvent, in which a PAS having a high degree of polymerization can be obtained at a high yield and the generation of a byproduct that imposes a large burden of a waste treatment and the like can be effectively reduced, and a PAS having a high degree of polymerization.

Solution to Problem

The present inventors have intensively studied to solve the above-described problems, and as a result found that since, among byproducts produced by a polymerization reaction for a PAS, a byproduct in an ultra fine powder form having poor handleability due to the fine size (size in which it passes through a 400-mesh screen) contains various oligomer components and the like and has a complexed composition, higher cost and more processes for detoxification are required in a waste treatment and the like. The inventors have further studied, and as a result, found that when a part of the oligomer components contained in the byproduct in an ultra fine powder form is selectively converted into a PAS having a high degree of polymerization, the problems can be solved. Thus, the present invention has been completed.

Specifically, the present invention provides a method of producing a PAS including:

(1) a preparation step of preparing a charged mixture containing an organic amide solvent, a sulfur source, water, and a dihalo aromatic compound;

(2) a first-stage polymerization step of performing a polymerization reaction on the charged mixture at a temperature of from 170 to 280° C. to produce a prepolymer having a conversion ratio of the dihalo aromatic compound of 50% or greater; and (3) a second-stage polymerization step of continuing the polymerization reaction in a phase-separated state at a temperature of from 245 to 290° C. in a reaction system containing the prepolymer, the method including adding a polyfunctional compound to the reaction system in the phase-separated state. As a result, a PAS having a melt viscosity (310° C., shear rate: 1216 sec$^{-1}$) of from 0.1 to 8000 P·s is produced by the method.

Advantageous Effects of Invention

The present invention exerts an effect capable of providing a method of producing a PAS by a polymerization reaction of a sulfur source and a dihalo aromatic compound in an organic amide solvent, in which a PAS having a high degree of polymerization can be obtained at a high yield and the generation of a byproduct that imposes a large burden of a waste treatment and the like can be effectively reduced, and a PAS having a high degree of polymerization.

DESCRIPTION OF EMBODIMENTS

1. Sulfur Source

As a sulfur source in the present invention, a sulfur source containing one or both of an alkali metal sulfide and an alkali metal hydrosulfide is preferably used. As the sulfur source, hydrogen sulfide can be also used. Specifically, an alkali metal hydrosulfide (e.g., NaSH) or an alkali metal sulfide (e.g., Na$_2$S) can be produced by blowing hydrogen sulfide into an alkali metal hydroxide (e.g., NaOH). As the sulfur source, an alkali metal hydrosulfide or a sulfur source containing the alkali metal hydrosulfide as a main component is more preferable.

Examples of the alkali metal hydrosulfide include lithium hydrosulfide, sodium hydrosulfide, potassium hydrosulfide, rubidium hydrosulfide, cesium hydrosulfide, and mixtures of two or more types thereof, but the alkali metal hydrosulfide is not limited to these. The alkali metal hydrosulfide may be used in the form of anhydrate, hydrate, or aqueous solution. Among these, sodium hydrosulfide and lithium hydrosulfide are preferable from the perspective of being readily available industrially at a low price. A small amount of alkali metal sulfide may be also contained in the alkali metal hydrosulfide used in the present invention.

Examples of the alkali metal sulfide include lithium sulfide, sodium sulfide, potassium sulfide, rubidium sulfide, cesium sulfide, and mixtures of two or more types thereof, but the alkali metal sulfide is not limited to these. The alkali metal sulfide may be used in the form of anhydrate, hydrate, or aqueous solution. Among these, sodium sulfide is preferable from the perspective of being readily available industrially at a low price and being easily handled. As these alkali metal sulfides, alkali metal sulfides ordinarily commercially available in the form of hydrates can be used in addition to those contained as byproducts in the alkali metal hydrosulfide. Examples of the hydrate of alkali metal sulfide include sodium sulfide nonahydrate, and sodium sulfide pentahydrate.

The total amount of moles of the alkali metal hydrosulfide and the alkali metal sulfide is an amount of moles of the sulfur source that directly relates to the production of a PAS (hereinafter, also referred to as "charged sulfur source" or "effective sulfur source"). Furthermore, in the case where a dehydration step is performed before a preparation step, this total amount of moles is an amount of moles of the sulfur source after the dehydration step.

2. Alkali Metal Hydroxide

Examples of the alkali metal hydroxide include lithium hydroxide, sodium hydroxide, potassium hydroxide, rubidium hydroxide, cesium hydroxide, and mixtures of two or more types thereof, but the alkali metal hydroxide is not limited to these. Among these, sodium hydroxide (NaOH) is preferable from the perspective of being readily available industrially at a low price.

3. Dihalo Aromatic Compound

A dihalo aromatic compound used in the present invention is a dihalogenated aromatic compound having two halogen atoms directly bonded to an aromatic ring. Specific examples of the dihalo aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone.

Note that the halogen atom indicates each atom of fluorine, chlorine, bromine, or iodine, and the two halogen atoms in the dihalo aromatic compound may be the same or different. The dihalo aromatic compound may be used alone or in a combination of two or more types thereof. The dihalo aromatic compound is preferably p-dihalobenzene in which halogen atoms are a chlorine atom, that is, p-dichlorobenzene (pDCB).

4. Molecular Weight Adjusting Agent, Branching/Crosslinking Agent

To form a terminal having a specific structure on a PAS to be produced or to adjust a polymerization reaction and/or the molecular weight, a monohalo compound (not necessarily an aromatic compound) may be used together. Furthermore, to produce a branched or crosslinked polymer, a polyhalo compound (not necessarily an aromatic compound) in which three or more halogen atoms are bonded, an active hydrogen-containing halogenated aromatic compound, a halogenated aromatic nitro compound, or the like may be used together. Preferable examples of the polyhalo compound as a branching/crosslinking agent include trihalobenzene.

5. Organic Amide Solvent

In the present invention, as a solvent for a dehydration reaction and a polymerization reaction, an organic amide solvent which is an aprotic polar organic solvent is used. The organic amide solvent is preferably an organic amide solvent which is stable against alkali at a high temperature. Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds such as 1,3-dialkyl-2-imidazolidinone; tetraalkyl urea compounds such as tetramethyl urea; and hexaalkylphosphoric triamide compounds such as hexamethylphosphoric triamide. The organic amide solvent may be used alone or in combination of two or more types thereof.

Among these organic amide solvents, N-alkylpyrrolidone compounds, N-cycloalkylpyrrolidone compounds, N-alkylcaprolactam compounds, and N,N-dialkylimidazolidinone compounds are preferable. In particular, N-methyl-2-pyrrolidone (NMP), N-methyl-ε-caprolactam, or 1,3-dialkyl-2-imidazolidinone is preferably used.

6. Polymerization Aid

In the present invention, for the purposes of accelerating the polymerization reaction and obtaining a PAS having a high degree of polymerization in a short period of time, various polymerization aids may be used as necessary.

Example of the polymerization aids include organic sulfonic acid metal salts, which are generally known as a polymerization aid of a PAS, lithium halides, organic carboxylic acid metal salts, and phosphoric acid alkali metal salts. The amount of the polymerization aid to be used is typically in a range from 0.01 to 10 mol per mole of the sulfur source (charged sulfur source) although the amount varies depending on the type of the compound to be used.

7. Phase Separation Agent

In the present invention, particularly in a polymerization step for a PAS, a phase separation agent may be contained in the reaction mixture from the perspective of accelerating the polymerization reaction and obtaining a PAS having a high degree of polymerization in a short period of time. Specifically, the method of producing a PAS of the present invention is a method of producing a PAS in the presence of the phase separation agent. The phase separation agent is used to perform liquid-liquid phase separation of the reaction mixture, in which the polymerization reaction has proceeded for a certain degree (liquid phase), into two phases, which are a concentrated polymer phase (dissolved PAS phase) and a dilute polymer phase (organic amide solvent phase). As the phase separation agent, a publicly known phase separation agent of a PAS can be used. Examples thereof include at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water. The phase separation agent may be used alone or in combination of two or more types thereof. Among the phase separation agents, water, an organic carboxylic acid metal salt such as sodium acetate, lithium acetate, lithium propionate, and lithium benzoate, and a combination thereof are preferable. The amount of the phase separation agent to be used is typically in a range from 0.01 to 20 mol, and preferably from 0.1 to 15 mol per kilogram of the organic amide solvent although the amount varies depending on the type of the compound to be used.

The phase separation agent may be present in the reaction mixture from the early stage of the polymerization reaction; however, the phase separation agent may be also added in the middle of the polymerization reaction. In the present invention, the polymerization reaction is continued in a second-stage polymerization step in a state where a concentrated polymer phase and a dilute polymer phase are phase-separated in the reaction system.

8. Dehydration Step

In the method of producing a PAS of the present invention, the dehydration step is preferably performed before the preparation step to adjust the amount of water in the reaction system. That is, the sulfur source often contains water such as hydrated water (crystallization water). When the sulfur source and the alkali metal hydroxide are used in the form of aqueous mixture, water is contained as a medium. The polymerization reaction of the sulfur source and the dihalo aromatic compound is affected by the amount of water present in the polymerization reaction system. Therefore, it is preferable to perform the dehydration step in which the amount of water is adjusted in the polymerization reaction system.

In the dehydration step, when a mixture of an organic amide solvent, a sulfur source (such as an alkali metal sulfide and/or an alkali metal hydrosulfide), and further an alkali metal hydroxide when the sulfur source contains the alkali metal hydrosulfide is heated desirably under an inert gas atmosphere, resulting in a reaction, at least a part of a distillate containing water is discharged from the system containing the mixture to the outside of the system. The dehydration step is typically performed in a reactor, and discharging of the distillate to the outside of the system is generally performed by discharging the distillate to the outside of the reactor. Water that should be dehydrated in the dehydration step includes hydrated water contained in the raw materials charged in the dehydration step, an aqueous medium of the aqueous mixture, and water produced by a side reaction between the raw materials.

The raw materials are generally charged into the reactor at a temperature range from about 20° C. to about 300° C., and preferably about 20° C. to about 200° C. The order of charging the raw materials is not specified, and the raw materials may be additionally charged into the middle of a dehydration operation. In the dehydration step, the organic amide solvent is used as a medium. The organic amide solvent used in the dehydration step is preferably the same organic amide solvent as one used in the polymerization step. From the perspective of being readily available industrially at a low price, N-methyl-2-pyrrolidone (NMP) is more preferable. The amount of the organic amide solvent to be used is typically from about 0.1 to 10 kg per mole of the sulfur source charged into the reactor.

The dehydration operation is performed, after charging the raw materials to the reactor, by heating the mixture containing the components described above typically at a temperature range of 300° C. or lower, and preferably from 100 to 250° C., typically for from 15 minutes to 24 hours, and preferably from 30 minutes to 10 hours.

In the dehydration step, water and the organic amide solvent are distilled as vapor by the heating. Therefore, the distillate contains water and the organic amide solvent. A part of the distillate may be refluxed in the system to suppress the discharging of the organic amide solvent to the outside of the system; however, at least a part of the distillate containing water is discharged outside the system to adjust the amount of water.

In the dehydration step, hydrogen sulfide originated from the sulfur source is volatilized. That is, in the dehydration step, when the mixture is heated, the sulfur source and water are reacted by the heating to produce hydrogen sulfide and an alkali metal hydroxide, thereby volatilizing the gaseous hydrogen sulfide. For example, when 1 mol of alkali metal hydrosulfide and 1 mol of water are reacted, 1 mol of hydrogen sulfide and 1 mol of alkali metal hydroxide are produced. As at least a part of the distillate containing water is discharged outside the system, the volatilized hydrogen sulfide is also discharged outside the system.

Due to the hydrogen sulfide which is volatilized outside the system in the dehydration step, the amount of the sulfur source in the mixture remaining in the system after the dehydration step decreases relative to the amount of the charged sulfur source. When the sulfur source containing an alkali metal hydrosulfide as the main component is used, the amount of the sulfur source in the mixture remaining in the system after the dehydration step is substantially equal to the value obtained by subtracting the amount of moles of the hydrogen sulfide volatilized outside the system from the amount of moles of the charged sulfur source. The sulfur source in the mixture remaining in the system after the dehydration step can be called "effective sulfur source." This effective sulfur source corresponds to "charged sulfur source" in the preparation step and the subsequent polymerization step.

The effective sulfur source after the dehydration step is the mixture containing the alkali metal hydrosulfide and/or the alkali metal sulfide, and the like, and a specific form thereof is not particularly limited. It has been conventionally known that when an alkali metal hydrosulfide and an alkali metal hydroxide are heated in an organic amide solvent, the alkali metal hydrosulfide and the alkali metal hydroxide are reacted in situ to form an alkali metal sulfide. It is conceived that when an alkali metal hydroxide is added in the dehydration step, an alkali metal sulfide is produced by a reaction of the alkali metal hydrosulfide with the alkali metal hydroxide.

As described above, the amount of the sulfur source charged initially in the dehydration step decreases after the dehydration step due to volatilization of hydrogen sulfide to the outside of the system. Thus, it is necessary to quantify the amount of the sulfur source (effective sulfur source) in the mixture remaining in the system after the dehydration step based on the amount of the hydrogen sulfide volatilized outside the system.

In the dehydration step, water such as hydrated water, water medium, and byproduct water is dehydrated until the amount thereof is within the range of necessary amount. In the dehydration step, the dehydration is preferably performed until the amount of water is preferably from 0 to 2 mol, more preferably from 0.5 to 2 mol, and further preferably from 1 to 1.8 mol, per mole of the effective sulfur source. When the amount of water is too low in the dehydration step, the amount of water can be adjusted to a desired amount by adding water in the preparation step performed before the polymerization step.

The alkali metal sulfide produces an alkali metal hydroxide via an equilibrium reaction with water. In the method of producing a PAS using the sulfur source containing an alkali metal hydrosulfide as a main component, the molar ratio of the charged amount of the alkali metal hydroxide per mole of the effective sulfur source is calculated taking the amount of the alkali metal sulfide, which is a component present in a small amount, into consideration. In the case of the alkali metal sulfide, when the hydrogen sulfide is volatilized outside the system in the dehydration step, the alkali metal hydroxide is produced in an amount by mole which is two times larger than that of the volatilized hydrogen sulfide. Thus, the molar ratio of the charged amount of the alkali metal hydroxide per mole of the effective sulfur source is calculated taking the amount of the hydrogen sulfide volatilized outside the system in the dehydration step into consideration.

In the dehydration step, a mixture containing the organic amide solvent, the sulfur source, and if desired, further the alkali metal hydroxide typically in an amount of from 0.7 to 1.05 mol, and in many cases, from 0.75 to 1 mol per mole of the sulfur source is preferably heated to discharge at least a part of the distillate containing water from the system containing the mixture to the outside of the system. When the molar ratio of the alkali metal hydroxide per mole of the sulfur source is too low, the amount of hydrogen sulfide volatilized in the dehydration step is large, thereby causing reduction in productivity due to decrease in the charged sulfur source amount, causing an abnormal reaction due to increase in a persulfide component in the charged sulfur source remaining after the dehydration, and readily causing deterioration in the quality of the PAS to be produced. When the molar ratio of the alkali metal hydroxide per mole of the sulfur source is too large, deterioration of the organic amide solvent may increase.

An apparatus for the dehydration step may be typically the same as or different from a polymerization vessel (reactor) used in the subsequent polymerization step. The material of the apparatus is preferably a corrosion resistant material such as titanium. In the dehydration step, a part of the organic amide solvent is typically discharged outside the reactor together with water.

9. Preparation Step

In the preparation step, a charged mixture containing the organic amide solvent, the sulfur source, water, and the dihalo aromatic compound, and if desired, the alkali metal hydroxide is prepared. In general, the dehydration step is often performed before the preparation step. Thus, the amounts of the components in the preparation step are adjusted taking adjustment of the amounts of the components in the mixture obtained in the dehydration step into consideration.

In the preparation step, the charged mixture containing the dihalo aromatic compound in an amount of typically from 0.9 to 1.5 mol, preferably from 0.95 to 1.2 mol, more preferably from 0.99 to 1.1 mol, and even more preferably from 1.00 to 1.08 mol per mole of the sulfur source is prepared.

In the preparation step, the charged mixture containing water in an amount of typically from 0 to 2 mol, preferably from 0.5 to 2 mol, and more preferably from 0.6 to 1.8 mol per mole of the sulfur source is prepared.

In the preparation step, the charged mixture containing the organic amide solvent in an amount of typically from 0.1 to 10 kg, and preferably from 0.15 to 1 kg per mole of the sulfur source is prepared. The amount of the organic amide solvent may be varied in the middle of the polymerization step described below as long as it falls within the range described above.

In the preparation step, the charged mixture containing the alkali metal hydroxide in an amount of typically from 0.85 to 1.2 mol, preferably from 0.9 to 1.1 mol, more preferably from 0.95 to 1.09 mol, and even more preferably from 0.98 to 1.06 mol per mole of the sulfur source is prepared, if desired. When the molar ratio of the alkali metal hydroxide per mole of the sulfur source is too high, deterioration of the organic amide solvent may be increased, and an abnormal reaction or a decomposition reaction during polymerization may be caused. In the first-stage polymerization step, when the molar ratio of the alkali metal hydroxide per mole of the sulfur source is within the range, the polymerization reaction may be stably performed, and a high-quality PAS may be easily obtained.

The amount ratio (molar ratio) of each of the components in the charged mixture is typically adjusted by adding components other than the sulfur source to the mixture obtained in the dehydration step. For example, when the amounts of the alkali metal hydroxide and water in the mixture obtained in the dehydration step are small, these components are added in the preparation step. The dihalo aromatic compound is added in the preparation step. As a result, the charged mixture is prepared.

10. Polymerization Step

In the present invention, the polymerization reaction is performed by at least two polymerization steps including the first-stage polymerization step and the second-stage polymerization step. Specifically, the polymerization step in the present invention includes: the first-stage polymerization step of subjecting the charged mixture to a polymerization reaction at a temperature of from 170 to 280° C. to produce a prepolymer having a conversion ratio of the dihalo aromatic compound of 50% or greater; and the second-stage polymerization step of continuing the polymerization reaction in a phase-separated state at a temperature of from 245 to 290° C. in the reaction system containing the prepolymer. The polymerization reaction time in each of the first-stage polymerization step and the second-stage polymerization step is generally in the range from 10 minutes to 72 hours, and preferably from 30 minutes to 48 hours. The first-stage polymerization step and the second-stage polymerization step may each include a plurality of steps in which temperature conditions are stepwise varied and water and the alkali metal hydroxide are separately added.

In the first-stage polymerization step, the polymerization reaction is performed in the reaction system in which the components including a polymer to be produced are uniformly dissolved. In the second-stage polymerization step, the polymerization reaction is continued in a state where a concentrated polymer phase and a dilute polymer phase are phase-separated in the presence of the phase separation agent. Since the polymerization reaction is generally performed with stirring, a phase-separated polymerization reaction is practically performed in a state where the concentrated polymer phase is dispersed as droplets in the organic amide solvent (dilute polymer phase). The phase-separated state can be clearly observed as the second-stage polymerization reaction proceeds.

The polymerization reaction method may be a batch method, a continuous method, or a combination of both methods. In batch polymerization, a method using two or more reaction vessels may be employed to shorten the polymerization cycle time.

10-1. First-Stage Polymerization Step

In the first-stage polymerization step, the charged mixture is subjected to the polymerization reaction at a temperature of from 170 to 280° C., to produce the prepolymer having a conversion ratio of the dihalo aromatic compound of 50% or greater. The conversion ratio of the dihalo aromatic compound in the produced prepolymer is preferably from 80 to 99%, and more preferably from 85 to 99%. The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the charged amount of the dihalo aromatic compound, and the charged amount of the sulfur source.

In the first-stage polymerization step, the polymerization reaction is initiated using the charged mixture. As long as this condition is employed, the amount of at least one of water, the alkali metal hydroxide, and the organic amide solvent may be varied in the middle of the polymerization reaction. For example, water and the alkali metal hydroxide may be added to the reaction system in the middle of the polymerization. It is preferable that the charged mixture prepared in the preparation step be typically used to initiate the polymerization reaction in the first-stage polymerization step and terminate the first-stage polymerization reaction.

The polymerization reaction in the first-stage polymerization step is performed preferably at a temperature range from 180 to 270° C., and more preferably from 190 to 267° C. When the temperature at which the polymerization reaction is performed is too low, the polymerization rate is too slow. In contrast, when the temperature is a high temperature exceeding 280° C., the PAS to be produced and the organic amide solvent tend to be decomposed, and the degree of polymerization of the PAS to be produced is significantly low. In order to obtain a PAS having high molecular weight (high melt viscosity), the polymerization temperature in the first-stage polymerization step is preferably controlled within a range from 200 to 265° C.

10-2. Second-Stage Polymerization Step

In the second-stage polymerization step, the polymerization reaction is then continued in the phase-separated state at a temperature of from 245 to 290° C. in a reaction system containing the prepolymer produced in the first-stage polymerization step described above. The polymerization temperature in the second-stage polymerization step is typically higher than that in the first-stage polymerization step, and is preferably from 250 to 280° C., and more preferably from 255 to 275° C. When the polymerization temperature in the second-stage polymerization step is too low, the phase-separation does not occur. Thus, a PAS having a high degree of polymerization is unlikely to be obtained. When the polymerization temperature is too high, the PAS to be produced and the organic amide solvent may be decomposed. The polymerization temperature can be maintained at a fixed temperature. However, the polymerization temperature may be stepwise or continuously increased or decreased in the second-stage polymerization step, as necessary.

Due to the presence of the phase separation agent, the polymerization reaction system (polymerization reaction mixture) is phase-separated into the concentrated polymer phase (phase having high polymer concentration in the organic amide solvent) and the dilute polymer phase (phase having low polymer concentration in the organic amide solvent) in the second-stage polymerization step. The phase separation may occur by adjustment of timing of adding the phase separation agent, adjustment of the polymerization temperature, or the like, in the middle of the second-stage polymerization step.

As the phase separation agent, a substance known to function as a phase separation agent in this technical field can be used, and is specifically as described above. The amount of the phase separation agent to be used is as described above. Therefore, the phase separation agent added in the second-stage polymerization step is preferably water in which the cost is low and the post-treatment is easy.

When a method of adding water as the phase separation agent is employed in the second-stage polymerization step, the amount of water is adjusted so that the amount of water in the reaction system is typically greater than 4 mol and 20 mol or less, preferably from 4.1 to 14 mol, and more preferably from 4.2 to 10 mol, per kilogram of the organic amide solvent. This amount of water typically corresponds to an amount of greater than 2 mol and 10 mol or less, preferably from 2.3 to 7 mol, and more preferably from 2.5 to 5 mol, per mole of the sulfur source.

10-3. Addition of Polyfunctional Compound

The method of producing a PAS of the present invention includes adding a polyfunctional compound in the second-stage polymerization step of continuing the polymerization reaction in the phase-separated state (hereinafter, also referred to as "second-stage polymerization step in the phase-separated state"). The polyfunctional compound added in the second-stage polymerization step in the phase-separated state indicates a compound having, in each molecule, a plurality of, preferably from 2 to 5, and more preferably from 2 to 3 functional groups which can be reacted with a terminal structure of an oligomer having a degree of polymerization of several tens or a byproduct having an abnormal terminal, in which propagation is typically difficult, and of the prepolymer produced in the first-stage polymerization step. The polyfunctional compound may be used alone or in combination with two or more types.

The polyfunctional compound is not particularly limited as long as it has the function described above. For example, a compound used as a branching/crosslinking agent in the conventional method of producing a PAS can be used. Specific examples of the functional group include at least one functional group selected from the group consisting of a halogen group, a thiol group (also referred to as "mercapto group"), a carboxyl group, and derivatives thereof. Preferred examples of the polyfunctional compound include a compound having at least one functional group selected from the group consisting of a halogen group, a thiol group, a carboxyl group, and derivatives thereof. Further, a compound having, in each molecule, a plurality of function groups which are one or two or more types of the functional groups is used. A compound soluble in the organic amide solvent at the polymerization temperature in the second-stage polymerization step in the phase-separated state is typically employed.

From the viewpoint of the terminal structure of the oligomer or the byproduct, the reactivity with the prepolymer, the degree of polymerization (melt viscosity) and yield of the PAS to be obtained, and the like, the polyfunctional compound is more preferably at least one selected from the group consisting of polyhaloaromatic compounds, aromatic thiol compounds, aromatic carboxylic acids, and derivatives thereof. Specific examples thereof include polyhaloaromatic compounds such as trihalo aromatic compounds (e.g., 1,2,4-trichlorobenzene); dihalo aromatic compounds (e.g., p-dichlorobenzene); and aromatic thiol compounds such as 2,4-dichlorobenzenethiol (also referred to as "DCB-SH" or "DCBT") and 4,4'-thiobisbenzenethiol (also referred to as "BTTB"). The polyfunctional compound is particularly preferably 1,2,4-trichlorobenzene (also referred to as "TCB").

The amount of the polyfunctional compound added in the second-stage polymerization step in the phase-separated state is typically from 0.01 to 2 mol, preferably from 0.05 to 1 mol, more preferably from 0.07 to 0.8 mol, and particularly preferably from 0.08 to 0.7 mol, relative to 100 mol of the sulfur source. When the amount of the polyfunctional compound relative to 100 mol of the sulfur source is too small, the yield of the PAS is not increased. When the amount of the polyfunctional compound is too large, undesired significant change in physical properties may be caused due to increase in production cost and excessive progression of a crosslinking reaction.

The timing of adding the polyfunctional compound in the second-stage polymerization step in the phase-separated state is not particularly limited as long as the temperature reaches a temperature of from 245 to 290° C. which is the polymerization temperature at which the reaction system is subjected to the polymerization reaction in the phase-separated state in the second-stage polymerization step, and the timing is after the reaction system is in the phase-separated state and before the second-stage polymerization step in the phase-separated state is completed. The timing is preferably immediately after the temperature reaches a temperature of from 245 to 290° C. which is the polymerization temperature after addition of the phase separation agent to the reaction system. When the polyfunctional compound is added to the reaction system after phase separation, the polyfunctional compound is selectively reacted with the component such as the oligomer present in the dilute polymer phase, and the reactants are incorporated into the concentrated polymer phase. As a result, the yield can be increased.

When the polyfunctional compound used in the present invention is added before the second-stage polymerization step in the phase-separated state, for example, in the first-stage polymerization step, the polyfunctional compound is reacted during production of the prepolymer by the polymerization reaction of the sulfur source and the dihalo aromatic compound. As a result, the proportion of forming a branched or crosslinked prepolymer is increased. Therefore, increase in yield is not confirmed and the physical properties are significantly varied. On the other hand, when the polyfunctional compound is added after completion of the second-stage polymerization step in the phase-separated state, a sufficient reaction time of the polyfunctional compound cannot be secured. This is because the polymerization reaction has already proceeded to high level. Thus, an effect of increasing the yield of the PAS is often reduced.

A reason why the effect of increasing the yield of a PAS having a high degree of polymerization is exerted by adding the polyfunctional compound in the second-stage polymerization step in the phase-separated state is not necessarily obvious, but in the present invention, the reason is presumed as follows. Specifically, among polymerization products, a byproduct in an ultra fine powder form which passes through a 400-mesh (opening diameter: 38 µm) screen contains various components such as a cyclic oligomer, a low-molecular-weight oligomer, and an oligomer having an abnormal terminal. In particular, most of the low-molecular-weight oligomers having a degree of polymerization of several tens and the oligomers having an abnormal terminal, in which propagation is typically difficult (hereinafter simply referred to as "oligomers"), are present in a dilute produced polymer phase during phase-separated polymerization. Thus, when the oligomers are selectively reacted with the added polyfunctional compound in the dilute polymer phase, the molecular weight of the oligomers may be increased to be converted into a PAS having a desired degree of polymerization. That is, when the oligomers are selectively present in the dilute polymer phase in the phase-separated state, the oligomers are efficiently reacted with the polyfunctional compound and the reaction proceeds. As a result, it is considered that the PAS having a desired degree of polymerization is obtained. It is estimated that the cyclic oligomer contained in the byproduct in the ultra fine powder form is chemically stable and it is difficult to cause a recombination reaction. From the estimation, it is presumed that in the polymerization reaction product recovered after completion of the polymerization reaction, the yield of a PAS polymer is increased and the proportion of the polymerization reaction product in an ultra fine powder form is decreased according to the method of producing a PAS of the present invention. According to the method of producing a PAS of the present invention, the proportion of the byproduct in an ultra fine powder form which passes through a 400-mesh (opening diameter: 38 µm) screen (also referred to as "400 mesh-pass") may be typically 7% or less, preferably 6.8% or less, and more preferably 6.6% or less.

11. Post-Treatment Step and Recovery Step

In the method of producing a PAS of the present invention, a post-treatment and a recovery step after the polymerization reaction can be performed by an ordinary method. For example, when the reaction mixture is cooled after completion of the polymerization reaction including the second-stage polymerization step in the phase-separated state, a slurry containing a granular polymer product is obtained. The cooled product slurry is separated by filtration as it is or after diluted with water or the like, then washed and filtered repeatedly, and dried. Thus, a PAS can be recovered.

According to the method of producing a PAS of the present invention, a granular PAS polymer can be produced. The granular PAS polymer therefore can be separated from the reaction solution and easily separated from the byproduct, the oligomer, and the like by a sieving method using a screen, for example. For the product slurry, the polymer may be sieved at a high temperature. Specifically, the granular PAS polymer which is separated with a 100-mesh (opening diameter: 150 μm) screen (also referred to as "100 mesh-on") can be used as an article PAS.

After the filtration (sieving) described above, the PAS is preferably washed with the organic amide solvent, which is the same as the polymerization solvent, or an organic solvent such as ketones (e.g. acetone) and alcohols (e.g. methanol). The PAS may be washed with high-temperature water. The produced PAS may be treated with an acid or a salt such as ammonium chloride.

The product which passes through the 100-mesh (opening diameter: 150 μm) screen (also referred to as "100 mesh-pass") is also subjected to a treatment such as washing in the same manner as described, and then sieved with a 400-mesh (opening diameter: 38 μm) screen (also referred to as "400 mesh-on") to recover a fine powder having a size of 100 mesh-pass and 400 mesh-on and an ultra fine powder having a size of 400 mesh-pass. Since the amounts of the fine powder and the ultra fine powder, and in particular, the amount of the ultra fine powder to be produced are decreased, the present invention exerts an effect of contributing to the environmental problems and decreasing the cost of industrial waste treatment due to decrease in industrial waste.

12. Polyarylene Sulfide

According to the method of producing a PAS of the present invention, a granular PAS having a size of 100 mesh-on can be obtained at a high yield of typically 85% or greater, further 87% or greater, desirably 88%, and further 90% or greater. According to the production method of the present invention, in which the polyfunctional compound is added in the second-stage polymerization step in the phase-separated state, the yield can be increased by 0.5% or greater, and depending on the reaction conditions and selection of the polyfunctional compound, by 1% or greater, and further by 2% or greater, as compared with a case where the polyfunctional compound is not added in the second-stage polymerization step in the phase-separated state. In this case, the proportion of the byproduct in the ultra fine powder form having a size of 400 mesh-pass may be 7% or less, as described above. The present invention therefore can provide a method of producing a PAS in which the proportion of the byproduct in the ultra fine powder form having a size of 100 mesh-on is 85% or greater and the proportion of the byproduct in the ultra fine powder form having a size of 400 mesh-pass is 7% or less.

According to the production method of the present invention, a PAS having a high degree of polymerization and a melt viscosity measured at a temperature of 310° C. and a shear rate of 1216 sec$^{-1}$ of typically from 0.1 to 8000 Pa·s, preferably from 1 to 800 Pa·s, more preferably from 5 to 400 Pa·s, and even more preferably from 10 to 300 Pa·s can be obtained at a high yield. According to the production method of the present invention, the melt viscosity of the PAS can be 25 Pa·s or greater or 50 Pa·s or greater, and even 60 Pa·s or greater, if desired. Since the PAS obtained by the production method of the present invention is a granular PAS having an average particle size of typically from 120 to 1500 μm, preferably from 150 to 1200 μm, and more preferably from 200 to 1000 μm, the PAS has excellent handleability and can be used in various applications. If desired, the PAS may be a granular PAS having an average particle size of 400 μm or greater.

The PAS obtained by the production method of the present invention can be formed into various injection molded products or extrusion molded products such as sheets, films, fibers, and pipes, as it is or after undergoing oxidative-crosslinking, alone or by blending with various inorganic fillers, fibrous fillers, and various synthetic resins, if desired. The PAS obtained by the production method of the present invention exhibits excellent color tone. Furthermore, the PAS compound obtained by the production method of the present invention produces a small amount of volatile components and is also suitable for fields of electronic devices, and the like in which suppression of volatile components is expected. The PAS is particularly preferable PPS.

EXAMPLES

The present invention will be more specifically described hereinafter with reference to examples and comparative examples. Measurement methods for various types of characteristics and physical properties are as shown below.

(1) Yield

As the yield of a polymer, a proportion of the mass of the polymer actually recovered relative to a reference value, which was the mass of the polymer (theoretical amount) obtained by assuming that all effective sulfur source present in a reactor after the dehydration step was converted into the polymer, was calculated (unit: mass %).

(2) Melt Viscosity

The melt viscosity of the polymer was measured by a Capirograph 1-C manufactured by Toyo Seiki Seisaku-sho, Ltd., using about 20 g of a dried polymer. At this time, a flat die having a diameter of 1 mm and a length of 10 mm was used as the capillary, and the temperature was set to 310° C. The polymer sample was introduced into the instrument. After the sample was held for 5 minutes, the melt viscosity (hereinafter also referred to as "MV") at a shear rate of 1216 sec$^{-1}$ was measured (unit: Pa·s).

(3) Average Particle Size

The average particle size of the polymer was measured by a sieving method for polymer particles having a size of 100 mesh-on (opening diameter: 150 μm) using 7-mesh (opening diameter: 2800 μm), 12-mesh (opening diameter: 1410 μm), 16-mesh (opening diameter: 1000 μm), 24-mesh (opening diameter: 710 μm), 32-mesh (opening diameter: 500 μm), 60-mesh (opening diameter: 250 μm), and 80-mesh (opening diameter: 180 μm) sieves.

(4) Amounts of Fine Powder and Ultra Fine Powder to be Recovered

In a recovery step, a product passing through a 100-mesh (opening diameter: 150 μm) screen was sieved with a 400-mesh screen (opening diameter: 38 μm) to recover a fine powder having a size of 100 mesh-pass and 400 mesh-on and an ultra fine powder having a size of 400 mesh-pass. The amounts thereof were measured.

Example 1

1. Dehydration Step:

As a sulfur source, a sodium hydrosulfide (NaSH) aqueous solution was used. A 20-L autoclave (reactor) made of titanium was charged with 6000 g of N-methyl-2-pyrrolidone (hereinafter abbreviated as "NMP"), 2001 g of 62.42 mass % sodium hydrosulfide aqueous solution, and 1210 g of 73.58 mass % sodium hydroxide aqueous solution. The sulfur source composed of sodium hydrosulfide and sodium sulfide was represented by "S". The molar ratio (mol/mol) of sodium hydroxide to the sulfur source (NaOH/S) was 0.998.

The reactor was purged with nitrogen gas. Thereafter, the temperature of the reactor was gradually increased to 200° C. over about 3 hours with stirring at a revolution speed of a stirrer of 250 rpm. Thus, 1050 g of water ($H_2O$), 791 g of NMP, and 13.38 g (0.39 mol) of hydrogen sulfide ($H_2S$) were distilled.

2. Preparation Step:

After the dehydration step, the temperature of the reactor was cooled to 150° C., and 3353 g of p-dichlorobenzene (hereinafter abbreviated as "pDCB"), 2999 g of NMP, 4 g of sodium hydroxide having a purity of 97%, and 201 g of water were added to prepare a charged mixture. At that time, the temperature of the reactor was decreased to 140° C. The ratio (g/mol) of NMP/S in the reactor was 375, the ratio (mol/mol) of pDCB/S was 1.04, the ratio of (mol/mol) of $H_2O/S$ was 1.58, and the ratio (mol/mol) of NaOH/S was 1.06.

3. Polymerization Step:

First-Stage Polymerization Step

While the charged mixture was stirred by rotating a stirrer provided in the reactor at 250 rpm, the temperature was increased to 220° C. and then increased to 260° C. over 90 minutes, resulting in a polymerization reaction. The conversion ratio of pDCB after completion of the first-stage polymerization step was 90%.

Second-Stage Polymerization Step and Addition of Polyfunctional Compound

Subsequently, the revolution speed of the stirrer was increased to 400 rpm, 446 g of water was injected (the ratio of total amount of water/NMP in the reactor was 7.2 (mol/kg), and the ratio of total amount of water/effective S was 2.71 (mol/mol)) with continued stirring. The temperature of content of the reactor was increased to 265° C., resulting in a phase-separated state. 21.0 g of trichlorobenzene (TCB) as a polyfunctional compound (the amount of TCB was 0.5 (mol) relative to 100 mol of S) and 219 g of NMP were immediately added, and the temperature was maintained at 265° C. Thereafter, a polymerization reaction was performed for 2 hours.

4. Post-Treatment Step:

After completion of the reaction, the reaction mixture was cooled to around room temperature, and the reaction solution was passed through a 100-mesh screen. Thus, a granular polymer was separated by sieving. The separated polymer was washed twice with acetone, then washed three times with water, washed with a 0.3% acetic acid aqueous solution, and washed four times with water to obtain a washed polymer. The washed polymer was dried at 105° C. for 13 hours. The granular PAS polymer thus obtained had a melt viscosity of 109 Pa·s and an average particle size of 971 μm. The yield of the PAS polymer was 92.4%. The amount of the recovered fine powder was 2.3%, and the amount of the ultra fine powder was 5.4%.

Example 2

A granular PAS polymer was obtained through a polymerization step and a post-treatment step in the same manner as in Example 1 except that 4.0 g of TCB (the amount of TCB was 0.1 (mol) relative to 100 mol of S) was added in the second-stage polymerization step in the phase-separated state. The obtained granular PAS polymer had a melt viscosity of 33 Pa·s and an average particle size of 410 μm. The yield of the polymer was 88.5%. The amounts of the recovered fine powder and the ultra fine powder were 5.0% and 6.5%, respectively.

Example 3

A granular PAS polymer was obtained through a polymerization step and a post-treatment step in the same manner as in Example 1 except that 19.6 g of DCB-SH (the amount of DCB-SH was 0.5 (mol) relative to 100 mol of S) was added instead of TCB as the polyfunctional compound in the second-stage polymerization step in the phase-separated state. The obtained granular PAS polymer had a melt viscosity of 77 Pa·s and an average particle size of 580 μm. The yield of the polymer was 90.1%. The amounts of the recovered fine powder and the ultra fine powder were 4.4% and 5.5%, respectively.

Example 4

A granular PAS polymer was obtained through a polymerization step and a post-treatment step in the same manner as in Example 1 except that 5.5 g of BTTB (the amount of BTTB was 0.1 (mol) relative to 100 mol of S) was added instead of TCB as the polyfunctional compound in the second-stage polymerization step in the phase-separated state. The obtained granular PAS polymer had a melt viscosity of 28 Pa·s and an average particle size of 407 μm. The yield of the polymer was 92.9%. The amounts of the recovered fine powder and the ultra fine powder were 1.2% and 5.9%, respectively.

Comparative Example 1

A granular PAS polymer was obtained through a polymerization step and a post-treatment step in the same manner as in Example 1 except that TCB as the polyfunctional compound was not added in the second-stage polymerization step in the phase-separated state. The obtained granular PAS polymer had a melt viscosity of 32 Pa·s and an average particle size of 389 μm. The yield of the polymer was 88.0%. The amounts of the recovered fine powder and the ultra fine powder were 4.4% and 7.6%, respectively.

Comparative Example 2

A granular PAS polymer was obtained through a polymerization step and a post-treatment step in the same manner as in Example 1 except that 21.1 g of TCB (the amount of TCB was 0.5 (mol) relative to 100 mol of S) was added in the preparation step instead of TCB added as the polyfunctional compound in the second-stage polymerization step in the phase-separated state and the amount of p-DCB to be added was changed to 3577 g (the ratio (mol/mol) of pDCB/S was 1.112). The obtained granular PAS polymer had a melt viscosity of 28 Pa·s and an average particle size of 412 μm. The yield of the polymer was 89.0%. The amounts of the recovered fine powder and the ultra fine powder were 3.5% and 7.5%, respectively.

Comparative Example 3

A granular PAS polymer was obtained through a polymerization step and a post-treatment step in the same manner as in Comparative Example 2 except that 12 g of TCB (the amount of TCB was 0.3 (mol) relative to 100 mol of S) was added and the amount of p-DCB to be added was changed to 3524 g (the ratio (mol/mol) of pDCB/S was 1.095). The obtained granular PAS polymer had a melt viscosity of 20 Pa·s and an average particle size of 367 μm. The yield of the polymer was 89.7%. The amounts of the recovered fine powder and the ultra fine powder were 1.8% and 8.5%, respectively.

Comparative Example 4

A granular PAS polymer was obtained through a polymerization step and a post-treatment step in the same manner as in Example 1 except that TCB as the polyfunctional compound was not added in the second-stage polymerization step in the phase-separated state, and the amount of p-DCB to be added was changed to 3287 g (the ratio (mol/mol) of pDCB/S was 1.02). The obtained granular PAS polymer had a melt viscosity of 105 Pa·s and an average particle size of 901 μm. The yield of the polymer was 90.2%. The amounts of the recovered fine powder and the ultra fine powder were 0.8% and 9.0%, respectively.

The types, addition timings, and addition amounts of the polyfunctional compounds, the yields, melt viscosities (MV), and average particle sizes of the PAS polymers, and the recovery amounts of the fine powder and the ultra fine powder in Examples 1 to 4 and Comparative Examples 1 to 4 are shown in Table 1.

92%, and the amount of the ultra fine powder was 6% or less. Thus, depending on selection of the type and addition amount of the polyfunctional compound added in the second-stage polymerization step in the phase-separated state, the molecular weight of the oligomer can be increased, the yield can be further increased, and the amount of the ultra fine powder to be produced can be further decreased.

In Comparative Examples 1 and 4 in which the polyfunctional compound was not added, the ultra fine powder (byproduct in an ultra fine powder form) having a size of 400 mesh-pass was produced in a large amount of 7.6% and 9.0%, respectively. In Comparative Examples 2 and 3 in which the polyfunctional compound was added in the first-stage polymerization step, but not in the second-stage polymerization step in the phase-separated state, the ultra fine powder was produced in a large amount of 7.5% and 8.5%, respectively, which were equal to or greater than that in Comparative Example 1. This shows that an effect obtained by addition of the polyfunctional compound is not exerted.

According to the method of producing a PAS of the present invention, it is presumed that the molecular weight of an oligomer having a degree of polymerization of several tens or an oligomer having an abnormal terminal, in which propagation is typically difficult, contained in a polymeriza-

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Polyfunctional compound | Type | TCB | TCB | DCB-SH | BTTB | — | TCB | TCB | — |
| | Addition timing | Second-stage polymerization step in phase-separated state | | | | — | First-stage polymerization step | | — |
| | Addition amount (mole relative to 100 mol of S) | 0.5 | 0.1 | 0.5 | 0.1 | — | 0.5 | 0.3 | — |
| Polymerization product | Yield of PAS polymer (%) | 92.4 | 88.5 | 90.1 | 92.9 | 88.0 | 89.0 | 89.7 | 90.2 |
| | MV (Pa·s) | 109 | 33 | 77 | 28 | 32 | 28 | 20 | 105 |
| | Average particle size (μm) | 971 | 410 | 580 | 407 | 389 | 412 | 367 | 901 |
| | Fine powder (%) | 2.3 | 5.0 | 4.4 | 1.2 | 4.4 | 3.5 | 1.8 | 0.8 |
| | Ultra fine powder (%) | 5.4 | 6.5 | 5.5 | 5.9 | 7.6 | 7.5 | 8.5 | 9.0 |

As seen from Table 1, according to the method of producing a PAS in Examples 1 to 4, which includes (1) a preparation step of preparing a charged mixture containing an organic amide solvent, a sulfur source, water, and a dihalo aromatic compound; (2) a first-stage polymerization step of performing a polymerization reaction on the charged mixture at a temperature of from 170 to 280° C. to produce a prepolymer having a conversion ratio of the dihalo aromatic compound of 50% or greater; and (3) a second-stage polymerization step of continuing the polymerization reaction in a phase-separated state at a temperature of from 245 to 290° C. in a reaction system containing the prepolymer, the method including adding a polyfunctional compound to the reaction system in the phase-separated state, the yield of the PAS polymer was greater than 88%, the granular PAS polymer having a MV of 25 Pa·s or greater, which is high degree of polymerization, and an average particle size of 400 μm or greater was obtained, and the amount of the ultra fine powder was decreased to 7% or less. In particular, in Example 1 in which TCB as the polyfunctional compound was added in an amount of 0.5 mol relative to 100 mol of S, and Example 4 in which BTTB as the polyfunctional compound was added in an amount of 0.1 mol relative to 100 mol of S, the yield of the PAS polymer was greater than tion product in an ultra fine powder form can be increased by a recombination reaction in a produced polymer dilute phase in the phase-separated state due to the presence of the polyfunctional compound added in the second-stage polymerization step, to convert the oligomers into a PAS having a desired degree of polymerization. As a result, a byproduct in an ultra fine powder form which requires a treatment as an industrial waste is decreased, and the yield of the PAS polymer is increased.

INDUSTRIAL APPLICABILITY

The present invention can provide a method of producing a PAS by a polymerization reaction of a sulfur source and a dihalo aromatic compound in an organic amide solvent, including:

(1) a preparation step of preparing a charged mixture containing an organic amide solvent, a sulfur source, water, and a dihalo aromatic compound;

(2) a first-stage polymerization step of performing a polymerization reaction on the charged mixture at a temperature of from 170 to 280° C. to produce a prepolymer having a conversion ratio of the dihalo aromatic compound of 50% or greater; and (3) a second-stage polymerization step of continuing the polymerization reaction in a phase-separated state at a temperature of from 245 to 290° C. in a reaction system containing the prepolymer, the method including adding a polyfunctional compound to the reaction system in the phase-separated state, in which a PAS having a high degree of polymerization can be obtained at a high yield and the generation of byproduct that imposes a large burden of a waste treatment can be effectively reduced. Further, the present invention can provide a PAS having a high degree of polymerization. Therefore, the present invention has high industrial applicability.

The invention claimed is:

1. A method of producing a polyarylene sulfide comprising:
   (1) a preparation step of preparing a charged mixture containing an organic amide solvent, a sulfur source, water, an alkali metal hydroxide, and a dihalo aromatic compound;
   (2) a first-stage polymerization step of performing a polymerization reaction on the charged mixture at a temperature of from 170 to 280° C. to produce a prepolymer having a conversion ratio of the dihalo aromatic compound of 50% or greater; and
   (3) a second-stage polymerization step of continuing the polymerization reaction in a phase-separated state at a temperature of from 245 to 290° C. in a reaction system containing the prepolymer,
   the method including adding a polyfunctional compound to the reaction system in the phase-separated state after the temperature reaches 245 to 290° C., and after a phase separation agent is added to the reaction system in the second-stage polymerization.

2. The method of producing a polyarylene sulfide according to claim 1, wherein the sulfur source contains one or both of an alkali metal sulfide and an alkali metal hydrosulfide.

3. The method of producing a polyarylene sulfide according to claim 1, further comprising a dehydration step of heating a mixture containing an organic amide solvent, a sulfur source, and an alkali metal hydroxide to discharge at least a part of distillate containing water from a system containing the mixture to the outside of the system before the preparation step.

4. The method of producing a polyarylene sulfide according to claim 1, wherein, in the preparation step, the charged mixture containing the dihalo aromatic compound in an amount of from 0.95 to 1.2 mol per mole of the sulfur source is prepared.

5. The method of producing a polyarylene sulfide according to claim 1, wherein, in the preparation step, the charged mixture containing water in an amount of from 0.5 to 2 mol per mole of the sulfur source is prepared.

6. The method of producing a polyarylene sulfide according to claim 1, wherein, in the preparation step, the charged mixture containing the alkali metal hydroxide in an amount of from 0.95 to 1.09 mol per mole of the sulfur source is prepared.

7. The method of producing a polyarylene sulfide according to claim 1, wherein the polyfunctional compound is added in an amount of from 0.01 to 2 mol per 100 mol of the sulfur source.

8. The method of producing a polyarylene sulfide according to claim 1, wherein the polyfunctional compound has at least one functional group selected from the group consisting of a halogen group, a thiol group, a carboxyl group, and derivatives thereof.

9. The method of producing a polyarylene sulfide according to claim 1, wherein the polyfunctional compound is at least one selected from the group consisting of a polyhaloaromatic compound, an aromatic thiol compound, an aromatic carboxylic acid, and derivatives thereof.

10. The method of producing a polyarylene sulfide according to claim 1, wherein a phase separation agent is at least one selected from the group consisting of an organic carboxylic acid metal salt, an organic sulfonic acid metal salt, an alkali metal halide, an alkaline earth metal halide, an alkaline earth metal salt of aromatic carboxylic acid, a phosphoric acid alkali metal salt, an alcohol, a paraffin hydrocarbon, and water.

11. The method of producing a polyarylene sulfide according to claim 1, wherein a proportion of a byproduct in an ultra fine powder form having a size of 100 mesh-on is 85% or greater and a proportion of a byproduct in an ultra fine powder form having a size of 400 mesh-pass is 7% or less.

12. The method of producing a polyarylene sulfide according to claim 1 further comprising:
   (4) a recovery step of recovering the polyarylene sulfide by sieving a reaction solution through a 100-mesh screen after the second stage polymerization step, the polyarylene sulfide in a dry state having a melt viscosity of 0.1 to 33 Pa·s measured at a temperature of 310° C. and a shear rate of 1,216 $\sec^{-1}$.

* * * * *